United States Patent [19]

Sandhagen et al.

[11] Patent Number: 4,922,198
[45] Date of Patent: May 1, 1990

[54] DISPLACEMENT SENSOR INCLUDING A PIEZOELECTRIC ELEMENT AND A MAGNETIC MEMBER

[75] Inventors: Jürgen Sandhagen, Adenbüttel; Udo Renger, Wolfsburg, both of Fed. Rep. of Germany

[73] Assignee: Volkswagen AG, Wolfsburg, Fed. Rep. of Germany

[21] Appl. No.: 308,095

[22] Filed: Feb. 8, 1989

[30] Foreign Application Priority Data

Feb. 10, 1988 [DE] Fed. Rep. of Germany ....... 3894027

[51] Int. Cl.$^5$ .......................... G01B 7/30; G01P 3/48; H01L 41/08; F02P 17/00
[52] U.S. Cl. .............................. 324/207.13; 324/166; 324/262; 324/207.22; 310/328; 123/616
[58] Field of Search .............. 324/166, 168, 173, 174, 324/207, 208, 235, 262; 310/339, 328; 123/616

[56] References Cited

U.S. PATENT DOCUMENTS 4,677,378 6/1987 Tokura et al. ...................... 324/208

Primary Examiner—Reinhard J. Eisenzopf
Assistant Examiner—Walter E. Snow
Attorney, Agent, or Firm—Brumbaugh, Graves, Donohue & Raymond

[57] ABSTRACT

In the embodiments described in the specification, a device having gear teeth to provide magnetic asymmetries rotates adjacent to a permanent magnet which is part of a mechanical mounting for a piezoelectric transducer. Relative motion between the gear teeth and the magnet subjects the transducer to a varying mechanical stress so that it generates a pulsed output voltage signal having an amplitude which is independent of surrounding influences.

3 Claims, 1 Drawing Sheet

DISPLACEMENT SENSOR INCLUDING A PIEZOELECTRIC ELEMENT AND A MAGNETIC MEMBER

BACKGROUND OF THE INVENTION

This invention relates to devices for detecting motion or relative position between two parts and, more particularly, to devices for generating electrical signals in response to relative motion such as rotational speed sensors for the crankshaft of an internal combustion engine.

Heretofore, devices have been arranged to detect magnetic asymmetries between relatively moving parts. By magnetic asymmetries is meant periodic variations extending in the direction of relative motion of regions of high and low permeability. Such asymmetries usually consist of a sequence of teeth of ferromagnetic material with gaps between the teeth, which may be open or filled with a material of lower permeability. For example, the teeth of a gear rotationally fixed to a crankshaft provide magnetic asymmetries to indicate. the speed or rotational position of the crankshaft. With the inductive sensors customarily used for this purpose, voltage pulses are induced in a stationary coil during relative motion between the gear teeth and a stationary part, and the number of voltage pulses per unit time is a measure of the crankshaft speed.

When such devices are arranged to measure the crankshaft speed and the crank angle at a given time of an internal combustion engine of a motor vehicle, they must be capable of high resolution over a wide range of speeds since such engines may have a crankshaft speed varying from zero to about 10,000 rpm. Generally, the number of teeth on a gear used for this purpose may be about 120 and the voltage pulses are generated at a frequency between zero and about 20 kHz.

Conventional devices or sensors used for this purpose either lack the necessary ability to produce signals of constant amplitude over the entire engine speed or frequency range, or they fail to meet other basic requirements for use with automobile engines, such as mechanical ruggedness, adequate range of service temperatures, electrical and magnetic interference suppression, and suitability for mass production in terms of outlay and expense.

One significant disadvantage of sensors which rely on the inductive principle is the undesirable dependence of signal amplitude of the electrical signals on the frequency and/or speed or rotation. As a result, difficulties are encountered in maintaining tolerances, and elaborate signalprocessing electronics are necessary.

Conventional optoelectronic devices also lack the necessary signal fidelity and have been ruled out by signal fidelity and space requirements.

Sensors based on the Wiegand effect are technically advantageous, but they are too expensive for mass production for use in motor vehicle engines, for example.

Development of Hall sensors has not yet been completed. At present, the total outlay for the components required to generate signals, including signal processing and voltage supply, is too high.

SUMMARY OF THE INVENTION

Accordingly, it is an object of the present invention to provide a device for indicating motion between or relative position of two parts which overcomes the above-mentioned disadvantages of the prior art.

Another object of the invention is to provide a motion and relative position indicator which is useful in internal combustion engines for motor vehicles.

A further object of the invention is to provide such a device which will provide the necessary precision and independence of signal amplitude from frequency with minimum cost for a selected speed and/or frequency range such as that of the crankshaft of an internal combustion engine.

These and other objects of the invention are attained by providing a sensor having a piezoelectric transducer arranged to be responsive to magnetic asymmetries. Preferably, one of two relatively moving parts has a magnetic element with a piezoelectric transducer arranged to respond to motion of the magnetic element due to changes in an asymmetric magnetic field as a result of relative motion of the parts.

Thus, the invention solves the prior art problems in a strikingly simple manner in that a piezoelectric element, which may be of any shape, for example, a chip or bar, round or polygonal, experiences pulsating influences of force by way of a magnetic field, the said magnetic field being likewise periodically altered in intensity by the described magnetic asymmetries in the course of the relative movements. It has been found that the voltage pulses thus provided at the output terminals of the piezoelectric element precisely reproduce the location and number of the magnetic asymmetries (i.e., gear teeth) so that they may be used, for example, to trigger electronic regulating and control devices. Any conventional support arrangement may be provided for the piezoelectric element so that compression, tension or bending stresses resulting from the magnetic asymmetries will be exerted on the piezoelectric element.

As in any contactless sensor system relying upon magnets or magnetic fields between spaced components, the gaps between the components affect the signal amplitude and hence the sensitivity of the device. In contrast to conventional magnetic sensing systems, however, the signal amplitude produced by the device of the present invention is uninfluenced by the rotational speed or frequency of the asymmetric magnetic field.

To avoid interference effects upon the voltage signals generated by the piezoelectric transducer, the transducer and its support should be as light and rigid as feasible in all its parts so that the natural frequency of the system will be well above the maximum working frequency or critical harmonic frequencies.

BRIEF DESCRIPTION OF THE DRAWINGS

Further objects and advantages of the invention will be apparent from a reading of the following description of preferred embodiments with reference to the accompanying drawings in which.

DESCRIPTION OF PREFERRED EMBODIMENTS

Figure 1:
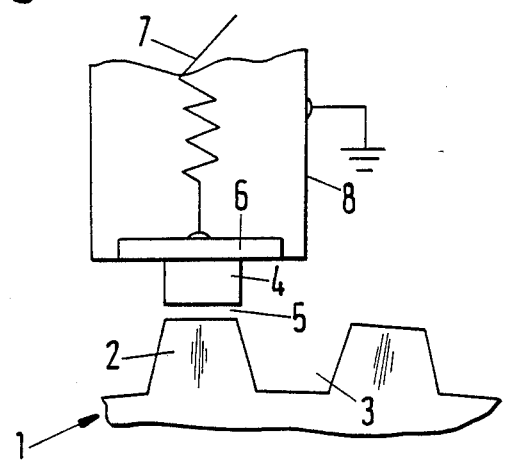
FIG. 1 is a schematic fragmentary view looking in the axial direction of a gear affixed to a crankshaft, illustrating a representative embodiment of the invention.

Referring first to the typical embodiment shown in FIG. 1, a gear sector 1, which is rotationally fixed to and concentric with a crankshaft (not shown), has gear teeth 2 separated by open spaces 3 so as to produce a series of magnetic asymmetries. Instead of being open, as shown, the spaces 3 may be filled with nonmagnetic material. A fixed permanent magnet 4, spaced from the teeth 2 by a gap 5, generates a magnetic field which is completed through the gear 1. It will be understood that the smaller the gap 5 between the magnet 4 and the rotating gear 1 at any given time, the greater will be the magnetic flux in the magnetic circuit. Accordingly, when a tooth 2 of ferromagnetic material is positioned adjacent to the permanent magnet 4, as shown in FIG. 1, the magnetic flux is relatively high, whereas the situation is reversed if an open space 3 is adjacent to the magnet 4.

In accordance with the invention, the permanent magnet 4 constitutes a component of a mount for a piezoelectric element 6. The piezoelectric element is mounted so that it generates an electrical output signal on a line 7 which depends on the mechanical stress to which the element 6 is subjected. The output on the line 7 is supplied to a conventional interpreting circuit. In addition, a housing 8, which is a stationary component of the detecting device, is maintained at ground potential and may contain microchips constituting the signal-interpreting circuit.

Accordingly, whenever the gap 5 is at its minimum as shown in FIG. 1, the mechanical stress on the piezoelectric element 6 produced by the magnetic field of the permanent magnet 4 is comparatively high, so that a comparatively high voltage signal is supplied to the line 7. When the gap 5 is large i.e., when an open space 3 is adjacent to the magnet 4, the magnetic stress on the piezoelectric element 6, and hence the voltage produced by that element, is at a minimum. Accordingly, rotation of the gear 1 produces a sequence of voltage pulses depending on the rotational speed which may be utilized to obtain information about both the speed and the angular position of the gear 1.

Figure 2:
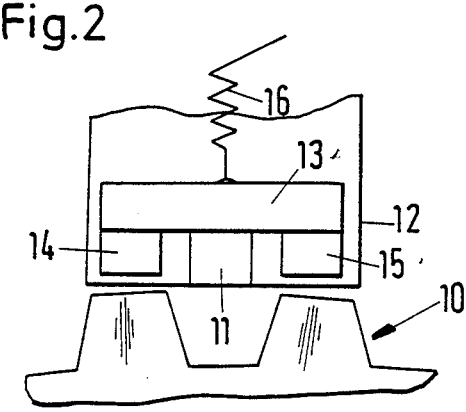
FIG. 2 is a schematic view similar to that of FIG. 1, showing a second embodiment of the invention.

In the embodiment of FIG. 2, a gear 10 is mounted on a crankshaft (not shown) and has alternate teeth and open spaces. A piezoelectric transducer 11 mounted on a grounded housing 12 is in the stationary part of the system. In this embodiment, the mechanical stress on the piezoelectric transducer 11 is applied by way of the ferromagnetic bridge 13 and permanent magnet elements 14 and 15 on opposite sides of the piezoelectric element 11 which are offset from each other in the plane of the gear 10. The output of the piezoelectric transducer 11 is applied to a signal line 16. As shown in FIG. 2, the distance between the two permanent magnets 14 and 15 is equal to the distance between two adjacent teeth of the gear 10.

Figure 3:
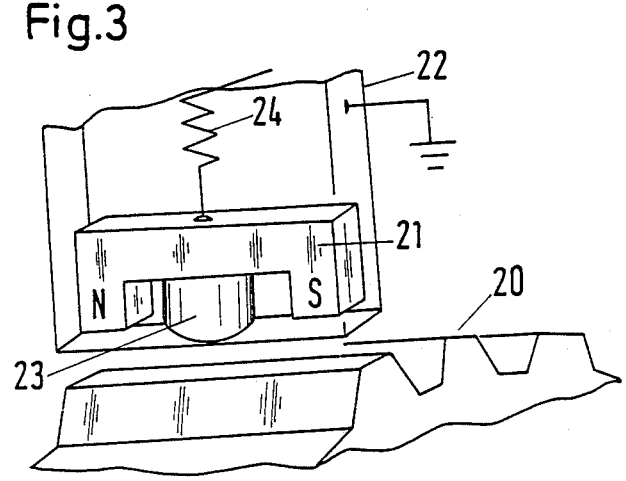
FIG. 3 is a fragmentary perspective view showing a third embodiment of the invention.

The embodiment shown in fragmentary perspective view in FIG. 3 includes a gear 20 and a permanent magnet 21 mounted in a stationary housing 22. The magnet 21 is oriented parallel to the direction of each tooth in the gear 20, i.e., perpendicular to the plane of the gear 20, so that it bridges each of the gear teeth in succession. The magnet 21 is approximately U-shaped and rests on a piezoelectric transducer 23, which is therefore subjected to a maximum compressive stress when a gear tooth is beneath the poles of the magnet 21 and to a minimum compressive strength when a space between the gear teeth is beneath the poles of the magnet. Consequently, a sequence of voltage pulses depending on the rotational speed at the time is applied by the transducer 23 to an output signal line 24.

The invention thus provides a device for generating electrical signals in response to relative motion between two parts which, at minimum cost, serves to generate pulsed electric signals for rotational speed and/or angular position over a wide range of speeds and/or frequencies with low tolerances and with little exposure to interference.

Although the invention has been described herein with reference to specific embodiments, many modifications and variations of the invention will readily occur to those skilled in the art. Accordingly, all such variations and modifications are included within the intended scope of the invention.

We claim:

1. Apparatus for generating signals in response to relative motion between two parts comprising magnetic means associated with a first part providing a defined sequence of magnetic asymmetries in the direction of relative motion of the parts, piezoelectric transducer means associated with a second part to generate an electric signal in response to an applied force, and mounting means for the piezoelectric transducer means responsive to the magnetic asymmetries resulting from relative motion of the first and second parts to apply varying force to the piezoelectric transducer means wherein the mounting means comprises a permanent magnet generating a magnetic field and arranged to transmit force to the piezoelectric transducer means and a ferromagnetic bridge arranged to transmit force to the piezoelectric transducer and including at least one permanent magnet on each side of the piezoelectric transducer to generate a magnetic field.

2. Apparatus according to claim 1 wherein the spacing between the permanent magnets corresponds to the spacing between adjacent magnetic asymmetries.

3. Apparatus for generating signals in response to relative motion between two parts comprising magnetic means associated with a first part providing a defined sequence of magnetic asymmetries in the direction of relative motion of the parts, piezoelectric transducer means associated with a second part to generate an electric signal in response to an applied force, and mounting means for the piezoelectric transducer means responsive to the magnetic asymmetries resulting from relative motion of the first and second parts to apply varying force to the piezoelectric transducer means wherein the mounting means comprises a permanent magnet generating a magnetic field and arranged to transmit force to the piezoelectric transducer means and a ferromagnetic bridge arranged to transmit force to the piezoelectric transducer and including at least one permanent magnet portion on each side of the piezoelectric transducer to generate a magnetic field and wherein the magnetic asymmetries are formed by teeth made of ferromagnetic material, and the permanent magnet portions are spaced in a direction parallel to the crests of the teeth.

* * * * *

UNITED STATES PATENT AND TRADEMARK OFFICE
CERTIFICATE OF CORRECTION

PATENT NO. : 4,922,198

DATED : May 1, 1990

INVENTOR(S) : Sandhagen et al.

It is certified that error appears in the above-identified patent and that said Letters Patent is hereby corrected as shown below:

Title page, Item 30, "3894027" should read --3804027--.

Signed and Sealed this

Twenty-eighth Day of April, 1992

Attest:

HARRY F. MANBECK, JR.

*Attesting Officer*   *Commissioner of Patents and Trademarks*